(12) United States Patent
Suzuki et al.

(10) Patent No.: US 8,616,232 B2
(45) Date of Patent: Dec. 31, 2013

(54) FUEL CUT-OFF VALVE

(75) Inventors: Keiji Suzuki, Oyama (JP); Norikazu Sugimura, Koga (JP)

(73) Assignee: Kyosan Denki Co., Ltd., Koga (JP)

( * ) Notice: Subject to any disclaimer, the term of this patent is extended or adjusted under 35 U.S.C. 154(b) by 345 days.

(21) Appl. No.: 12/819,649

(22) Filed: Jun. 21, 2010

(65) Prior Publication Data

US 2011/0005609 A1 Jan. 13, 2011

(30) Foreign Application Priority Data

Jul. 10, 2009 (JP) .................................. 2009-163354
Jul. 10, 2009 (JP) .................................. 2009-163355

(51) Int. Cl.
*F16K 31/18* (2006.01)

(52) U.S. Cl.
USPC ........................................... 137/202; 137/43

(58) Field of Classification Search
USPC ................................................. 137/202, 43
See application file for complete search history.

(56) References Cited

U.S. PATENT DOCUMENTS

| 5,028,244 | A | * | 7/1991 | Szlaga ............................ 96/163 |
| 6,994,103 | B2 | * | 2/2006 | Takahashi et al. ............ 137/202 |
| 7,147,017 | B2 | * | 12/2006 | Leonhardt ..................... 141/198 |
| 2007/0125427 | A1 | * | 6/2007 | Kaneko ......................... 137/202 |

FOREIGN PATENT DOCUMENTS

| JP | A-2004-257264 | 9/2004 |
| JP | A-2008-274922 | 11/2008 |

OTHER PUBLICATIONS

Jul. 23, 2013 Office Action issued in Japanese Patent Application No. JP2009-163354 (with English translation).

\* cited by examiner

*Primary Examiner* — John Rivell
*Assistant Examiner* — Angelisa Hicks
(74) *Attorney, Agent, or Firm* — Oliff & Berridge, PLC

(57) ABSTRACT

A fuel cut-off valve includes a case having a first opening communicated with the inside of a fuel tank and a second opening communicated with a canister; a lower float that is provided so as to move up and down inside the case and has a first valve member above the lower float; an upper float that is provided so as to move up and down above an upper portion of the lower float and has a second valve member and a third opening communicated with the canister; a first valve seat provided on the upper float, against which the first valve member abuts to close off the third opening; a second valve seat against which the second valve member abuts to close off the second opening; and a guide member that guides the upper float when the upper float moves up and down.

12 Claims, 19 Drawing Sheets

F I G . 18
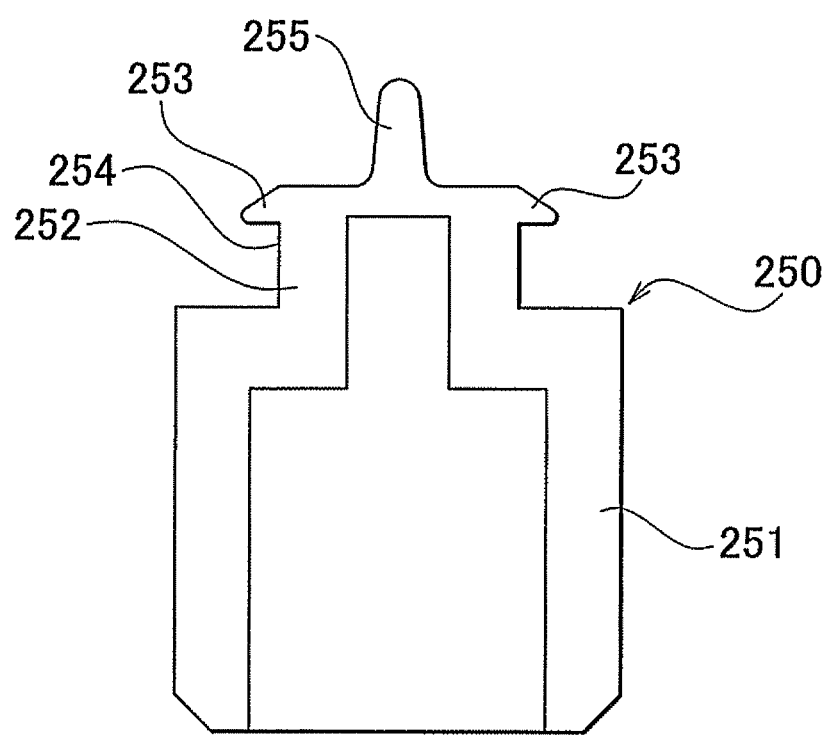

FUEL CUT-OFF VALVE

INCORPORATION BY REFERENCE

The disclosure of Japanese Patent Application No. 2009-163354 filed on Jul. 10, 2009 and Japanese Patent Application No. 2009-163355 filed on Jul. 10, 2009, including the specification, drawings and abstract are incorporated herein by reference in their entirety.

BACKGROUND OF THE INVENTION

1. Field of the Invention

The invention relates to a fuel cut-off valve. More particularly, the invention relates to a fuel cut-off valve that prevents fuel vapor inside a fuel tank of a vehicle or the like from flowing out to a canister and adhering to an adsorbent provided in the canister. The fuel cut-off valve according to the invention also prevents fuel in the fuel tank from flowing out to the canister when the fuel level rises.

2. Description of the Related Art

A fuel tank that stores fuel supplied to a combustion chamber of an engine is provided in a vehicle or the like. This fuel tank has a ventilation system that lets air in and out corresponding to decreases and increases in the amount of fuel in the tank. This ventilation system is formed as a system that provides communication between the inside of the fuel tank and a canister. If the fuel tank overflows, the spilled fuel flows out to the canister side, saturating the canister and thus rendering it useless. Therefore, a tank-full control valve is provided at an upper portion of the fuel tank. When the tank is full of fuel, the ventilation system closes off so that air and fuel will not flow out to the canister side.

In addition to the tank-full control valve, the fuel tank is also provided with a fuel-spill prevention valve that controls pressure fluctuation in the fuel tank by normally being open to the outside air, and which closes when the vehicle is inclined or rolls or the like. The tank-full control valve and the fuel-spill prevention valve may be provided separately. However, in order to keep costs down, a fuel cut-off valve having the functions of both of these valves is described in Japanese Patent Application Publication No. 2004-257264 (JP-A-2004-257264).

This fuel cut-off valve is shown in FIGS. 24 and 25. This fuel cut-off valve 1 houses an upper float 4 and a lower float 5 in an internal space 3 formed by a case 2. An upper opening 8a is provided above the internal space 3, a lower opening 8b is provided below the internal space 3, and a side hole 14 is provided in the upper peripheral wall surface of the case 2. Most of the case 2 is inserted into a fuel tank 6. A flange 7 formed horizontally on the upper outer peripheral wall of the case 2 is mounted to the upper wall surface of the fuel tank 6.

The lower float 5 is a member that rises when fuel in the fuel tank 6 enters the internal space 3 through the lower opening 8b. A first valve member 9 that is rod-shaped and has a small diameter is formed on the upper surface of the lower float 5. A second valve member 4a that is ring-shaped and has a large diameter is provided on the upper surface of the upper float 4. The upper float 4 is attached so as to be able to move up and down above the lower float 5. Also, the upper float 4 has a small diameter upper end opening 12 in the center. A first valve seat 10 against which the small diameter first valve member 9 of the lower float 5 may abut is formed on the lower end portion of this small diameter upper end opening 12.

A second valve seat 11 is formed on the lower end portion of the large diameter upper opening 8a, so that if fuel enters the internal space 3 through the lower opening 8b when the fuel tank 6 is being filled, for example, the lower float 5 and the upper float 4 will rise together and the small diameter first valve member 9 of the lower float 4 will abut against the first valve seat 10 of the upper float 4, thereby closing off the small diameter opening 12, while the second valve member 4a of the upper float 4 will abut against the second valve seat 11 formed on the lower end portion of the upper opening 8a, thereby closing off the large diameter upper opening 8a. As a result, fuel is prevented from flowing out to a canister, not shown, via a communication passage 13 above the upper opening 8a.

When the first valve member 9 and the second valve member 4a are closed, for example, the force with which the small diameter first valve member 9 abuts against the first valve seat 10 from the pressure inside the fuel tank 6 is much less than the force with which the large diameter second valve member 4a abuts against the second valve seat 11. Therefore, if the pressure inside the fuel tank 6 drops even slightly, the lower float 5 will fall under its own weight, such that the small diameter first valve member 9 will no longer abut against the first valve seat 10. As a result, the inside of the tank 6 will be communicated with the outside air via the small diameter upper end opening 12 and the side hole 14.

As a result, the pressure inside the fuel tank 6 will drop, such that the large diameter second valve member 4a will immediately come away from the second valve seat 11, thereby opening the large diameter upper opening 8a to the outside air, which will cause the pressure inside the fuel tank 6 to fall rapidly. Also, even if the lower opening 8b is closed off by fuel, for example, when the fuel tank 6 is full, the side hole 14 is provided in the side wall surface of the case 2, so fuel vapor produced inside the fuel tank 6 will flow through the side hole 14 toward the communication passage 13, thus preventing the pressure in the fuel tank 6 from becoming excessively high.

In this way, the fuel cut-off valve 1 according to the related art functions as both a tank-full control valve and a fuel-spill prevention valve, and is thus advantageous in terms of both cost and convenience.

The upper float 4 of the fuel cut-off valve 1 is provided with four mounting members 4b, each having an engaging groove 4c as shown in FIG. 25 on the lower surface, at equidistant locations concyclically. Also, the lower float 5 has a large diameter portion 5a and a small diameter portion 5b, and four retaining members 5c are provided at equidistant locations concyclically on the upper outer periphery of the small diameter portion 5b.

The engagement of these members will now be described. That is, the members engage by the upper float 4 being pushed down onto the upper portion of the lower float 5. At this time, the retaining members 5c of the lower float 5 fit inside the mounting members 4b of the upper float 4 while pushing the mounting members 4b to the outside. When the retaining members 5c reach the engaging grooves 4c in the mounting members 4b, the retaining members 5c fit into those engaging grooves 4c and the mounting members 4b spring back (i.e., return) to their original state. As a result, the lower float 5 and the upper float 4 are connected in a state in which they can move up and down a predetermined distance together.

When the valve is abutting against the valve seat, less offset results in a better seal between the valve and the valve seat. With the fuel cut-off valve 1, there is a slight gap between the outer periphery of the lower float 5 of the fuel cut-off valve 1 and the inner periphery of the case 2, so the lower float 5 is able to move laterally by an amount corresponding to the size of that gap. Also, the upper float 4 is smaller than the lower float 5 and is provided so as to be able to move a predetermined distance up and down with respect to the lower float 5. Further, there is also a slight gap between the mounting members 4b and the retaining members 5c in the lateral direction, so the upper float 4 is also able to move laterally by an amount corresponding to the size of that gap.

The lower float 5 is able to move laterally by an amount corresponding to the size of the gap between the outer periphery of the lower float 5 and the case 2, and the upper float 4 is able to move laterally farther than the lower float 5, or more specifically, by the cumulative distance of the gap between the outer periphery of the lower float 5 and the inner periphery of the case 2, and the gap between the upper float 4 and the lower float 5.

As described above, the upper float 4 of the fuel cut-off valve 1 is able to move laterally by the total distance of the gap between the outer periphery of the lower float 5 and the inner periphery of the case 2, and the gap between the upper float 4 and the lower float 5. Therefore, for example, even if there is a lateral offset of that amount, the large diameter second valve member 4a can still abut against the large diameter second valve seat 11, so no particular problems arise.

However, if a seal is achieved between the second valve member 4a and the second valve seat 11 while the lateral offset of the upper float 4 is greater than the gap between the outer periphery of the lower float 5 and the inner periphery of the case 2, for example, it becomes necessary to align the upper float 4 in order to seal between the small diameter first valve member 10 and the first valve seat 9. However, because the second valve member 4a is abutting against the second valve seat 11 in this case, a large amount of force is required to align the upper float 4, and as a result, the upper end opening 12 may not be sufficiently closed off.

With a conventional fuel cut-off valve, the gap is made as small as possible to reduce any offset. This is also true for the gap between the mounting members 4b and the retaining members 5c. However, as described above, the lower float 5 is placed into engagement with the upper float 4 while pushing and spreading the mounting members 4b of the upper float 4 outward. Therefore, the mounting members 4b must be made to be able to deform to some degree, and thus are susceptible to secondary deformation during engagement or as a result of a change in the environment, for example. Deformation of the mounting members 4b may result in greater offset.

SUMMARY OF THE INVENTION

Thus, this invention provides a fuel cut-off valve that has two seal portions, one large and one small, that improves the alignment of a lower float and an upper float.

The invention relates to a fuel cut-off valve. This fuel cut-off valve includes a case having a first opening communicated with the inside of a fuel tank and a second opening communicated with a canister; a lower float that is provided so as to move up and down inside the case and has a first valve member above the lower float; an upper float that is provided so as to move up and down on an upper portion of the lower float and has a second valve member and a third opening communicated with the canister; a first valve seat provided on the upper float, against which the first valve member abuts to close off the third opening; a second valve seat against which the second valve member abuts to close off the second opening; and a guide member that guides the upper float when the upper float moves up and down.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 18 is a sectional view taken along line XVIII-XVIII in FIG. 17;

DETAILED DESCRIPTION OF EMBODIMENTS

Figure 1:
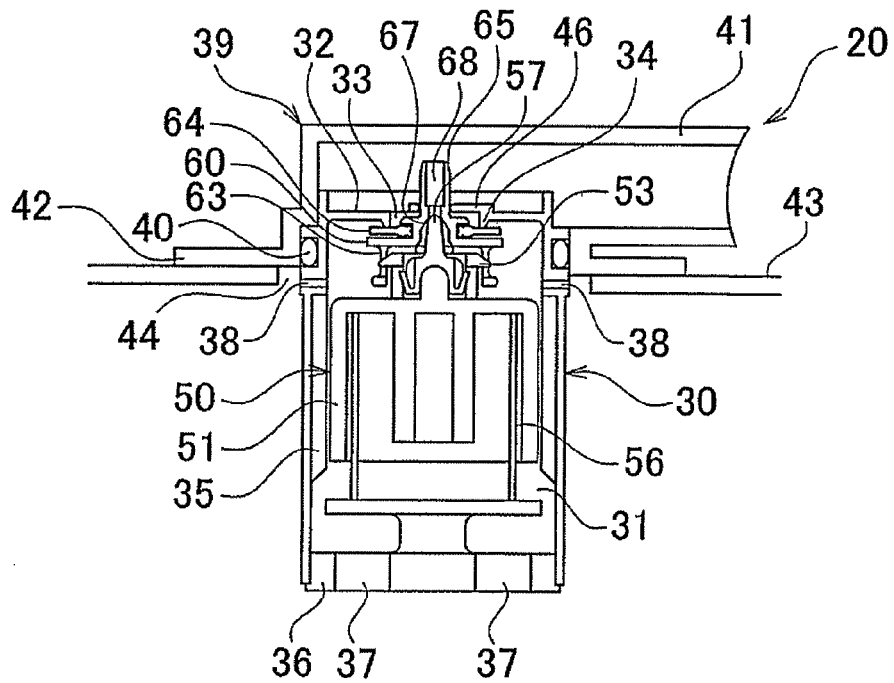
FIG. 1 is a full sectional view of a fuel cut-off valve according to a first example embodiment when both an upper float and a lower float are in closed positions.

A fuel cut-off valve according to a first example embodiment of the invention will be described with reference to the accompanying drawings. The fuel cut-off valve 20 includes a case 30, a lower float 50 arranged inside the case 30, an upper float 60, a middle float 57 that serves as a first valve member, and a second valve member 64, and the like.

The case 30 is a cylindrical member made of resin that is open at the bottom and has an internal space 31. A large diameter second opening 33 that is an upper opening communicated with the internal space 31 is provided in the center of an upper wall 32 of the case 30. Also, a circular second valve seat 34 against which the second valve member 64, to be described later, abuts is formed hanging down from the lower end portion of the second opening 33.

A plurality of longitudinal ribs 35 are provided at equidistant intervals vertically along the inner wall surface inside the case 30. These longitudinal ribs 35 form pathways for fuel vapor and the like by providing spaces between the inner wall surface of the case 30 and the outer peripheral surface of the lower float 50, as well as guide the vertical movement of the lower float 50 with the inner peripheral edges of the longitudinal ribs 35.

A bottom member 36 is attached by means such as heat welding to the bottom portion of the case 30. A first opening 37 that includes a plurality of lower openings to allow fuel and the like to enter the internal space 31 is bored in the bottom member 36. This first opening 37 is designed to allow fuel to enter the inner space 31 at times such as during fueling or when the vehicle becomes inclined or rolls, for example. During fueling or the like, the lower float 50 and the upper float 60 rise from the fuel entering the internal space 31 through the first opening 37. As a result, the second opening 33 becomes closed off by the second valve member 64 provided on the upper portion of the upper float 60, and a third opening becomes closed off by the first valve member, thereby preventing fuel from flowing out to a canister. Incidentally, the bottom member 36 may also be included as a portion of the case 30.

Also, a plurality of, such as two, circular side holes 38 are provided substantially opposite one another in the upper side wall surface of the case 30. The fuel vapor in the fuel tank 43 enters the internal space 31 through these side holes 38 and is discharged to a canister, not shown, via the second opening 33 and a communication passage 41.

A resin cap member 39 is attached over the case 30 via a seal member 40. A communication passage 41 that is communicated with the canister and a flange 42 that attaches to the fuel tank 43 are integrally formed with the cap member 39. As described above, the communication passage 41 is communicated with the canister, not shown, and thus allows fuel vapor inside the fuel tank 43 to be discharged to the canister, as well as allows outside air to be introduced into the fuel tank 43. Incidentally, the cap member 39 may also be integrally formed with the case 30.

A mounting hole 44 is provided in the upper wall surface of the fuel tank 43. The case 30 is inserted into this mounting hole 44, and the flange 42 of the cap member 39 is attached to the upper wall surface of the fuel tank 43. As a result, the fuel cut-off valve 20 is mounted inserted into the fuel tank 43, as shown in FIG. 1.

Figure 4:
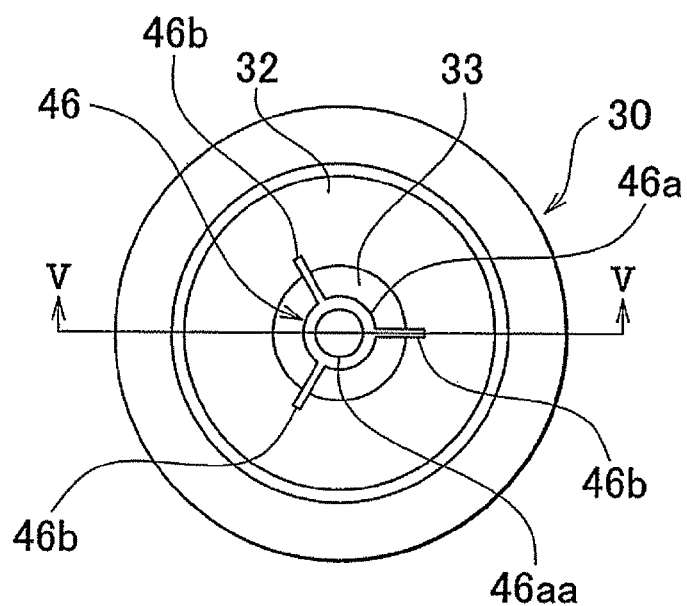
FIG. 4 is a plan view of a case.
Figure 5:
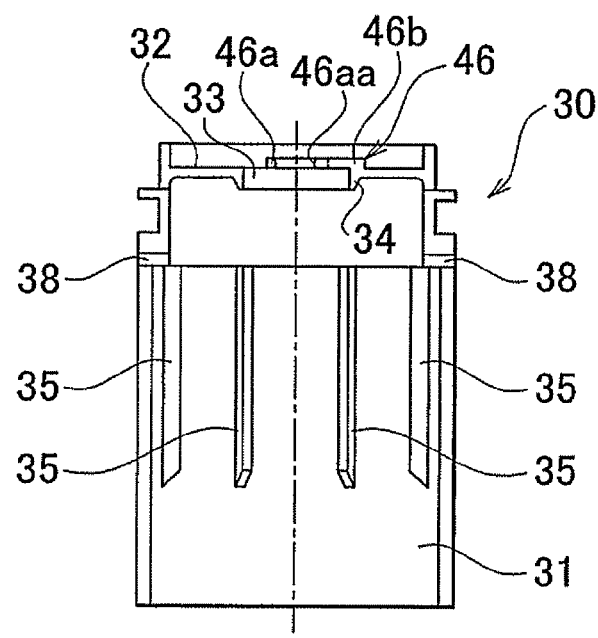
FIG. 5 is a sectional view taken along line V-V in FIG. 4.

A guide member 46 that guides a cylindrical body 65, which will be described later, is formed above the second opening 33 of the case 30. This guide member 46 is formed by a ring portion 46a and leg portions 46b, as shown in FIGS. 4 and 5. The ring portion 46a is a thin ring-shaped member with a diameter smaller than that of the second opening 33, which is formed in the center, right above or slightly above, the second opening 33. An inner peripheral edge 46aa of the ring portion 46a is formed in a sectional semicircular shape or an arc shape, and smoothly guides the cylindrical body 65 that will be described later.

The leg portions 46b are flat members that extend outward from the outer periphery of the ring portion 46a. A plurality, such as three, of these leg portions 46b are provided at equidistant intervals on the outer periphery of the ring portion 46a. The outer ends that are on the opposite side from the ring portion 46a extend out to the upper wall 32, and the lower edge portions of the outer ends are connected to the upper wall 32. That is, the ring portion 46a and the leg portions 46b are integrally formed with the upper wall 32. Incidentally, the guide member 46 may also be formed separate from the upper wall 32 and fixed thereto by fixing means such as heat welding or the like. Making the guide member 46 this way makes it easier to form the guide member 46 and also improves the guide function.

Figure 6:
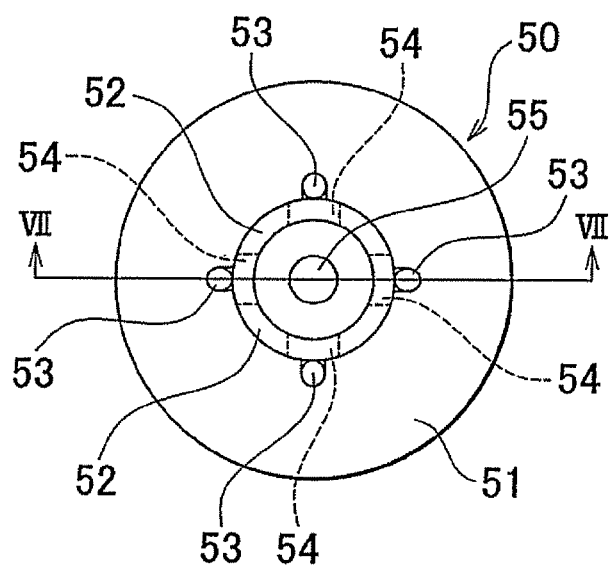
FIG. 6 is a plan view of the lower float.
Figure 7:
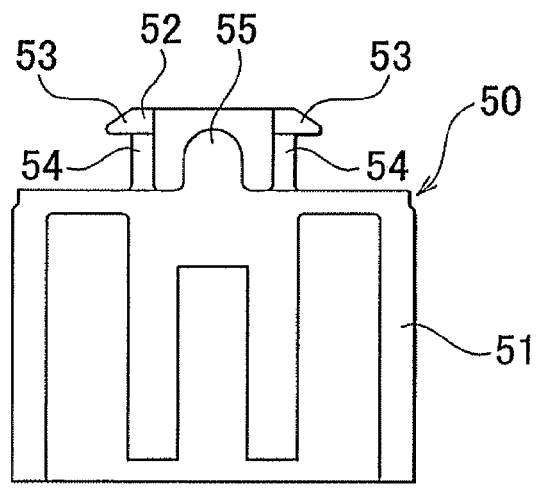
FIG. 7 is a sectional view taken along line VII-VII in FIG. 6.

Next, the member that is inserted into the case 30 will be described. The lower float 50 is a substantially hollow cylindrical member made of resin that is open at the bottom. FIG. 6 is a plan view of the lower float 50 and FIG. 7 is a sectional view of the lower float 50. The lower float 50 has a large diameter cylindrical portion 51 at the bottom and a small diameter cylindrical portion 52 at the top. The outer peripheral portion of the large diameter cylindrical portion 51 is guided by vertical longitudinal ribs 35 provided on the inside surface of the case 30.

The small diameter cylindrical portion 52 extends upward from the upper wall of the large diameter cylindrical portion 51. A plurality of, such as four, engaging pieces 53 that extend radially outward are provided at substantially equidistant intervals on the upper outer peripheral surface of the small diameter cylindrical portion 52. A retaining groove 54 with which a pawl 58a of the middle float 57, to be described later, engages is formed having an open cross-section shape with a width that is wider than the width of the engaging pieces 53, as shown in FIG. 6, below each engaging piece 53. Moreover, a columnar protruding portion 55, the tip end of which has an inverted U-shaped cross section that is arc-shaped, is formed erect in the center on the upper surface of the large diameter cylindrical portion 51, inside the small diameter cylindrical portion 52.

A spring 56 is interposed between the lower float 50 and the bottom member 36. This spring 56 itself does not have enough force to lift the lower float 50. Instead, it provides force that helps the lower float 50 to rise quickly when the lower float 50 rises due to buoyancy from the fuel when fuel enters the case 30.

Figure 8:
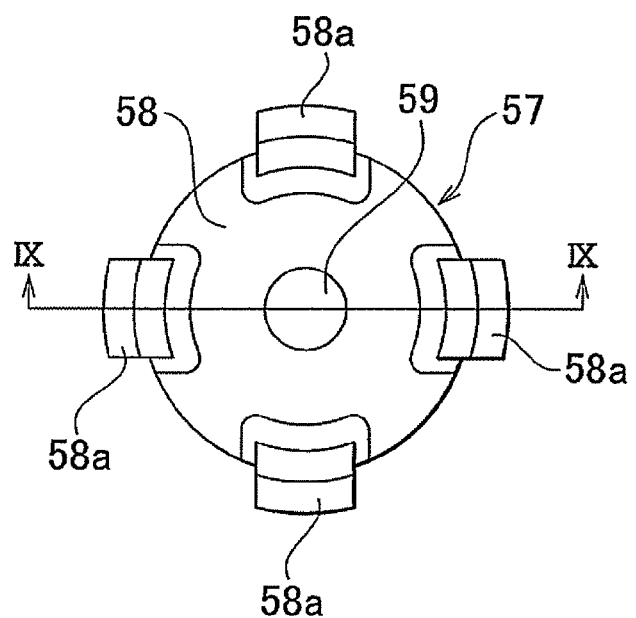
FIG. 8 is a plan view of a middle float (a first valve member that is separate from the lower float)
Figure 9:
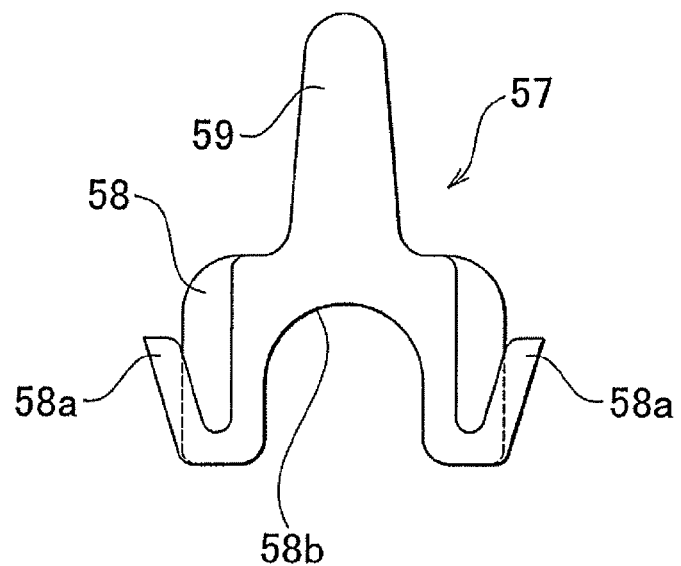
FIG. 9 is a sectional view taken along line IX-IX in FIG. 8.

The middle float 57 may be regarded as the first valve member of the invention. This middle float 57 is a resin member that forms a small diameter seal portion. FIG. 8 is a view plan view of the middle float 57 and FIG. 9 is a sectional view of the middle float 57. The middle float 57 has a main body portion 58 and a columnar body 59.

A plurality of, such as four, pawls 58a are provided at equidistant intervals on the outer peripheral portion of the main body portion 58, in a manner such that the tip ends of the pawls 58a spread outward. The diameter of a circle drawn at the tip ends of these four pawls 58a is larger than the inside diameter of the small diameter cylindrical portion 52 of the lower float 50, but smaller than the outer shape of the small diameter cylindrical portion 52. Therefore, once the middle float 57 is fitted into the small diameter cylindrical portion 52 of the lower float 50, the pawls 58a will not slip out of the retaining grooves 54 in the small diameter cylindrical portion 52.

A concave joining portion 58b that has an inverted U-shaped cross section is formed at the center of the bottom portion of the main body portion 58. The protruding portion 55 of the lower float 50 fits into the concave joining portion 58b with a slight gap between the protruding portion 55 and the concave joining portion 58b. The middle float 57 is tiltably supported by the lower float 50 by the curved surface engagement of the top surface of the concave joining portion 58b and the tip end of the protruding portion 55.

The columnar body 59 is a tapered portion with an arc-shaped tip end that stands erect in the center of the main body portion 58. This columnar body 59 may be regarded as the first valve member of the invention. This columnar body 59 opens and closes a third opening 68 that will be described later.

Figure 13A:
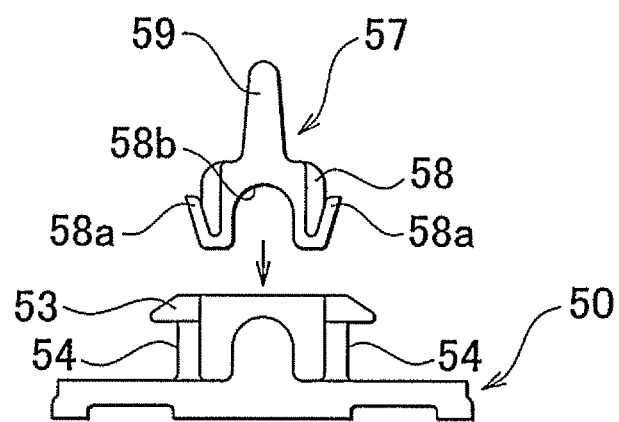
FIGS. 13A and 13B are views showing how the middle float is attached to the lower float.
Figure 13B:
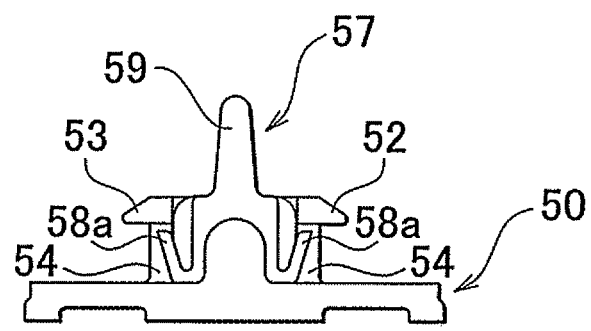

Next, the attachment of the middle float 57 to the small diameter cylindrical portion 52 of the lower float 50 will be described with reference to FIGS. 13A and 13B. FIG. 13A is a view showing the middle float 57 and the small diameter cylindrical portion 52 of the lower float 50 before they are attached together, and FIG. 13B is a view showing the middle float 57 and the small diameter cylindrical portion 52 of the lower float 50 after they are attached together. First, as shown in FIG. 13A, the middle float 57 is placed above the small diameter cylindrical portion 52 of the lower float 50, and then the middle float 57 is pushed down from above as indicated by the arrow. When this is done, the tip ends of the four pawls 58a of the middle float 57 catch on the inner surface of the small diameter cylindrical portion 52. When the middle float 57 is pushed down regardless of this, the pawls 58a bend inward such that the middle float 57 fits inside of the small diameter cylindrical portion 52. Moreover, when the middle float 57 is pushed down, the protruding portion 55 of the lower float 50 fits together with the concave joining portion 58b, and the pawls 58a reach the retaining grooves 54 in the small diameter cylindrical portion 52, at which time the tip ends of the pawls 58a slip into the retaining grooves 54 and return to their original shape.

As described above, FIG. 13B is a view showing the middle float 57 and the small diameter cylindrical portion 52 of the lower float 50 after they are attached together. That is, the middle float 57 is snap-fit engaged with the small diameter cylindrical portion 52 of the lower float 50. Once engaged, the pawls 58 will not disengage from the upper ends of the retaining grooves 54 in the small diameter cylindrical portion 52, and the middle float 57 is supported by the protruding portion 55 so as to be able to move together with the lower float 50.

The middle float 57 is able to tilt with respect to the lower float 50, which improves the alignment of the columnar body 59 (which may be regarded as the first valve member) of the middle float 57 and a first valve seat 67 of the upper float 60, which will be described later. That is, making the first valve member the middle float 57 that is separate from the lower float 50 enables the first valve member to follow the first valve seat 67 when the first valve member is offset from the first valve seat 67, and thus seal the third opening 68.

Incidentally, in this example embodiment, the middle float 57 (actually, the columnar body 59) that may be regarded as the first valve member is described as being separate from the lower float 50, but it may also be integrated with the lower float 50. That is, the middle float 57 may be omitted and the protruding portion 55 of the lower float 50 may serve as the columnar body 59.

Figure 10:
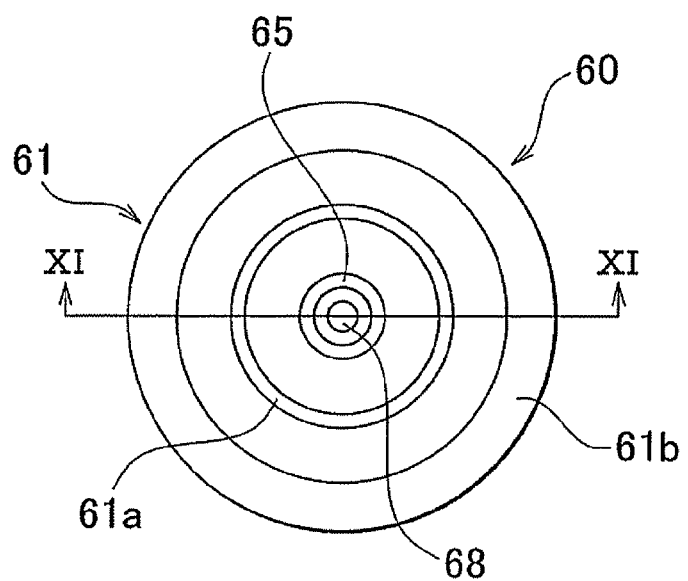
FIG. 10 is a plan view of the upper float.
Figure 11:
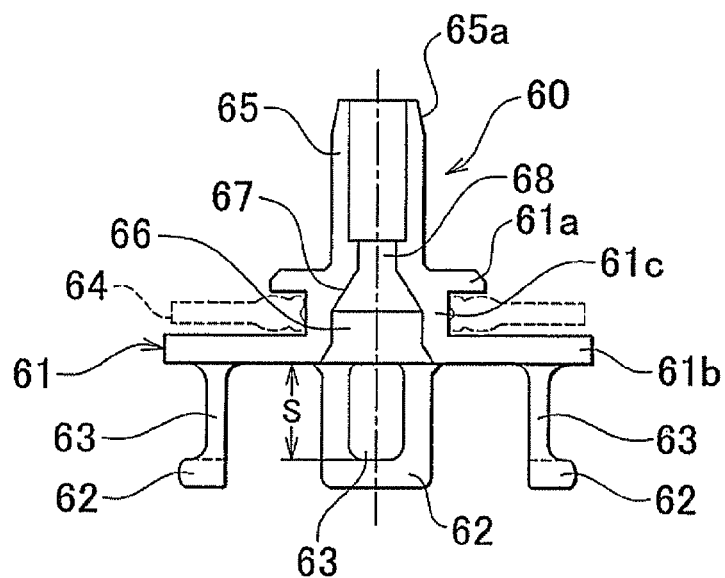
FIG. 11 is a sectional view taken along line XI-XI in FIGS. 10 and 12.
Figure 12:
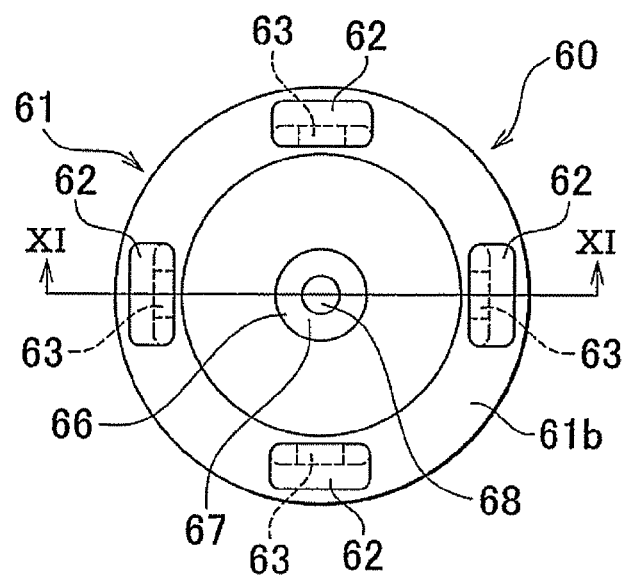
FIG. 12 is a bottom view of the upper float.

The upper float 60 is provided above the small diameter cylindrical portion 52 of the lower float 50. FIG. 10 is a plan view of the upper float 60, FIG. 11 is a sectional view of the upper float 60, and FIG. 12 is a bottom view of the upper float 60. The upper float 60 is made of resin and has a disc-shaped member 61 and leg members 62. The leg members 62 are a plurality of, such as four, members with arc-shaped cross sections that hang down at substantially equidistant intervals from the outer peripheral bottom surface of the disc-shaped member 61. Long vertical rectangular engaging grooves 63 with which the four retaining pieces 53 formed on the upper outer peripheral surface of the small diameter cylindrical portion 52 of the lower float 50 engage are provided near the lower end portions of the leg members 62.

The disc-shaped member 61 has an upper small diameter disc portion 61a, a lower large diameter disc portion 61b, and a columnar portion 61c that connects the small diameter disc portion 61a with the large diameter disc portion 61b. A second valve member 64 that is donut-shaped and made of rubber fits on the columnar portion 61c. This second valve member 64 abuts against the second valve seat 34 formed on the upper portion of the case 30 when the lower float 50 rises, thereby preventing fuel or the like from flowing out to the second opening 33 side. In this case, the second valve member 64 fits with some leeway both front to back and left to right, such that close contact is able to be maintained between the second valve member 64 and the second valve seat 34 even if the upper float 60 is inclined.

A cylindrical body 65 is provided standing erect in the center of the upper wall of the small diameter disc portion 61a of the upper float 60. This cylindrical body 65 is a hollow annular member. The tip of this cylindrical body 65 is a tapered portion 65a which facilitates assembly when it is inserted into the ring portion 46a of the guide member 46.

Also, a second concave joining portion 66 is formed up to the small diameter disc portion 61a in the center of the lower portion of the disc-shaped member 61. This second concave joining portion 66 is large enough so that the small diameter columnar body 59 on the middle float 57 can fit into it, and narrows toward the top. The first valve seat 67 against which the columnar body 59 of the middle float 57 abuts is formed at that narrow portion (see FIG. 11). The third opening 68 is formed communicated with the hollow portion of the cylindrical body 65 where the upper portion of this second concave joining portion 66 is narrow. That is, this third opening 68 is surrounded by the cylindrical body 65.

Then the columnar body 59 of the middle float 57 that is the first valve member is fitted into this second concave joining portion 66, and the upper float 60 is pivotally supported on the upper portion of the lower float 50 by abutting against the first valve seat 67.

The manner in which the upper float 60 is assembled to the lower float 50 will now be described. First, the second valve member 64 is fitted onto the columnar portion 61c which is a groove portion of the upper float 60. Then, the upper float 60 is placed onto the upper portion of the lower float 50 to which the middle float 57 has already been assembled as shown in FIG. 13. In this state, pressure is applied from the upper portion of the upper float 60 so that the upper float 60 moves down. When this is done, the leg members 62 get pushed outward by the retaining pieces 53, and the upper float 60 is pushed along the upper periphery of the small diameter cylindrical portion 52 of the lower float 50 until eventually the four retaining pieces 53 formed on the upper outer periphery of the small diameter cylindrical portion 52 fit into the corresponding engaging grooves 63 in the four leg members 62, such that the members (i.e., the upper float 60 and the lower float 50) become snap-fit engaged together. At the same time, the columnar body 59 of the middle float 57, which is the first valve member, fits into the second concave joining portion 66. As a result, the upper float 60 moves up and down together with the lower float 50 without separating from it.

Figure 2:
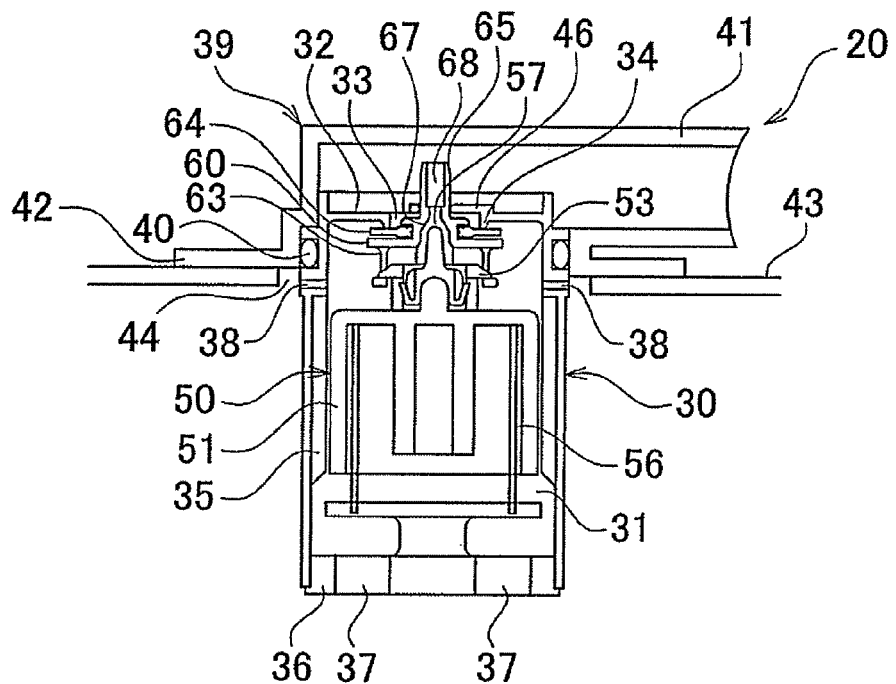
FIG. 2 is a full sectional view of the fuel cut-off valve according to the first example embodiment when the upper float is in a closed position and the lower float is in an open position.

The engaging grooves 63 have a length S (see FIG. 11). When the second opening 33 where the upper float 60 abuts against the second valve seat 34 is blocked off, the lower float 50 is able to fall by the length S, and at that time, the columnar body 59 of the middle float 57 that is the first valve member of the lower float 50 opens the third opening 68 in the center of the upper float 60. FIG. 2 shows a view of this state.

The general assembly of the fuel cut-off valve 20 will now be described. First, a float unit is prepared by fitting the middle float 57 to the upper portion of the lower float 50, and then fitting the upper float 60 to the upper portion of the middle float 57. Next, the case 30 is turned upside down and the float unit is inserted upside down into the case 30, and the cylindrical body 65 of the upper float 60 is inserted into the guide member 46 formed in the upper portion of the case 30. In this case, the tapered portion 65a is formed at the tip end of the cylindrical body 65 and the inner peripheral edge of the guide member 46 is semicircular, which facilitates insertion.

Figure 3:
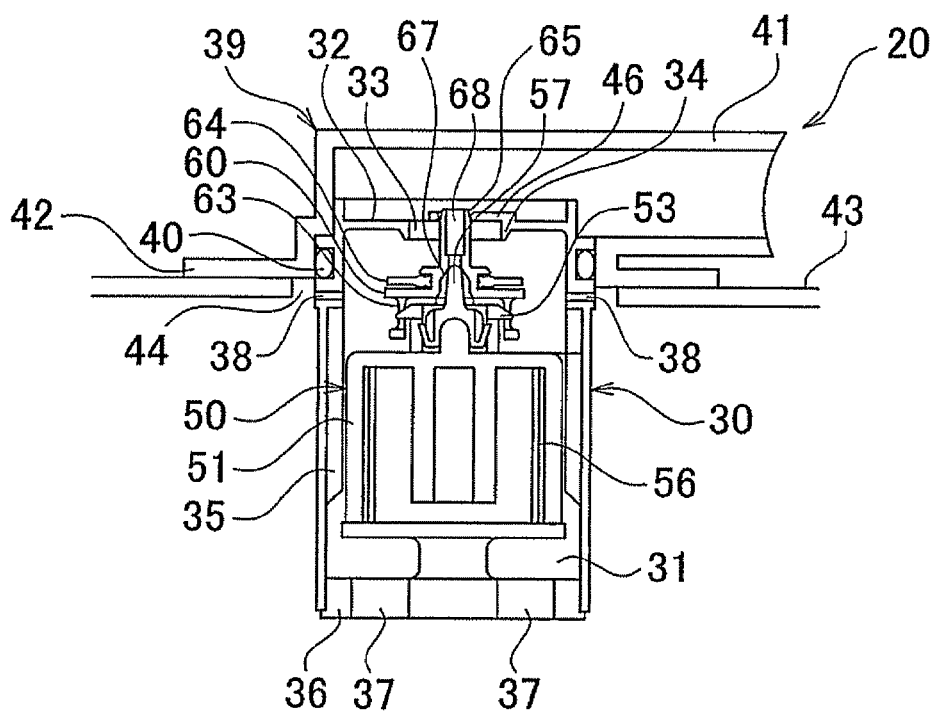
FIG. 3 is a full sectional view of the fuel cut-off valve according to the first example embodiment when both the upper float and the lower float are in open positions.

Next, the spring 56 is inserted into the case 30, and then the bottom member 36 is assembled or fixed in place. Then the case 30 is turned upright and the cap member 39 is assembled to the upper portion of the case 30, thereby completing assembly. FIG. 3 is a view showing the fuel cut-off valve 20 after assembly. Incidentally, the cylindrical body 65 is inside the guide member 46 all the way from the lowest position (i.e., the position shown in FIG. 3) of the lower float 50 to the highest position (i.e., the position shown in FIG. 1) of the lower float 50.

The clearance between the cylindrical body 65 and the guide member 46 is less than the clearance between the case 30 (the longitudinal ribs 35 when the longitudinal ribs 35 are provided) and the outer periphery of the lower float 50, and the offset between the second valve member 64 of the upper float 60 and the second valve seat 34 of the case 30 is within that range and is thus much less than it is with the related art. As a result, the offset between the columnar body 59 of the middle float 57 and the first valve seat 67 of the upper float 60 is also less. Further, even if the upper float 60 is offset from the lower float 50, for example, the seal of the third opening 68 is improved because the middle float 57 tilts to reduce that offset. Also, the inner peripheral edge 46aa of the guide member 46 is inside the second opening 33 to the inside of the second valve seat 34, and the cylindrical body 65 of the upper float 60 is guided by that inner peripheral edge 46aa, so even if the upper float 60 wobbles somewhat when it moves up and down, that vertical movement of the upper float 60 is able to be smooth.

Next, the operation of the fuel cut-off valve 20 when the fuel tank is filled full and thereafter will be briefly described. When fuel enters the internal space 31 from the first opening 37 right before the tank is full, for example, that fuel flows through the internal space 31 between the inner wall surface of the case 30 and the side wall surface of the lower float 50 and attempts to flow into the communication passage 41 via the second opening 33. However, fuel that enters the internal space 31 pushes both the upper float 60 and the lower float 50 to their upper positions, which closes off the second opening 33 and prevents fuel from flowing out into the communication passage 41. FIG. 1 shows a view of this state.

In this case, the cylindrical body 65 of the upper float 60 moves upward while being guided by the guide member 46. Accordingly, as described above, the offset between the second valve member 64 of the upper float 60 and the second valve seat 34 of the case 30, in particular, decreases, and the offset between the columnar body 59 of the middle float 57 and the first valve seat 67 of the upper float 60 also decreases.

Right after the tank has been filled full, the pressure inside the fuel tank 43 is high. As a result, high pressure is applied to the second valve member 64 from underneath so the second valve member 64 abuts with strong force against the second valve seat 34 and will not come out of abutment even if the pressure inside the fuel tank 43 drops somewhat. However, the lower float 50 abuts against the upper float 60 over the small area of the columnar body 59 of the middle float 57, which is the first valve member, and the second concave joining portion 66, so the columnar body 59 and the second concave joining portion 66 will come out of abutment with even the slightest drop in the fuel level inside the fuel tank 43.

If this happens, the lower float 50 will fall under its own weight, so the upper float 60 will be in the upper position and the lower float 50 will be in a lower position by the length S. FIG. 2 is a view showing this state.

After a period of time has passed after the tank has been filled full, the third opening 68 of the upper float 60 opens, so the pressure difference between the inside and the outside of the case 30 drops. As a result, the upper float 60 and the lower float 50 drop to their lower positions, such that fuel vapor produced in the fuel tank 43 enters the internal space 31 through the side holes 38 and flows to the canister via the second opening 33 and the communication passage 41, thereby ventilating the fuel tank 43. FIG. 3 is a view showing this state.

Next, a fuel cut-off valve according to a second example embodiment of the invention will be described. This fuel cut-off valve 220 includes a case 230, a lower float 250 arranged in the case 230, an upper float 260, a first valve member 255, and a second valve member 264 and the like.

The case 230 is a cylindrical member made of resin that is open at the bottom and has an internal space 231. A large diameter second opening 233 that is an upper opening communicated with the internal space 231 is provided in the center of an upper wall 232 of the case 230. Also, a circular second valve seat 234 against which a second valve member 264, to be described later, abuts is formed hanging down from the lower end portion of the second opening 233.

A plurality of longitudinal ribs 235 are provided at equidistant intervals vertically along the inner wall surface inside the case 230. These longitudinal ribs 235 form pathways for fuel vapor by providing spaces between the inner wall surface of the case 230 and the outer peripheral surface of the lower float 250, as well as guide the vertical movement of the lower float 250 with the inner peripheral edges of the longitudinal ribs 235.

A bottom member 236 is attached by means such as heat welding to the bottom portion of the case 230. A first opening 237 that includes a plurality of lower openings to allow fuel and the like to enter the internal space 231 is bored in the bottom member 236. The operation and effect of this first opening 237 are the same as the operation and effect of the first opening 37 in the first example embodiment. Incidentally, the bottom member 236 may also be included as a portion of the case 230.

Also, a plurality of, such as two, circular side holes 238 are provided substantially opposing one another in the upper side wall surface of the case 230. The fuel vapor in the fuel tank 243 enters the internal space 231 through these side holes 238 and is discharged to a canister, not shown, via the second opening 33 and a communication passage 241.

A resin cap member 239 is attached over the case 230 via a seal member 240. The communication passage 241 that is communicated with the canister and a flange 242 that attaches to the fuel tank 243 are integrally formed with the cap member 239. As described above, the communication passage 241 is communicated with the canister, not shown, and thus allows fuel vapor inside the fuel tank 243 to be discharged to the canister, as well as allows outside air to be introduced into the fuel tank 243. Incidentally, the cap member 239 may also be integrally formed with the case 230.

Figure 14:
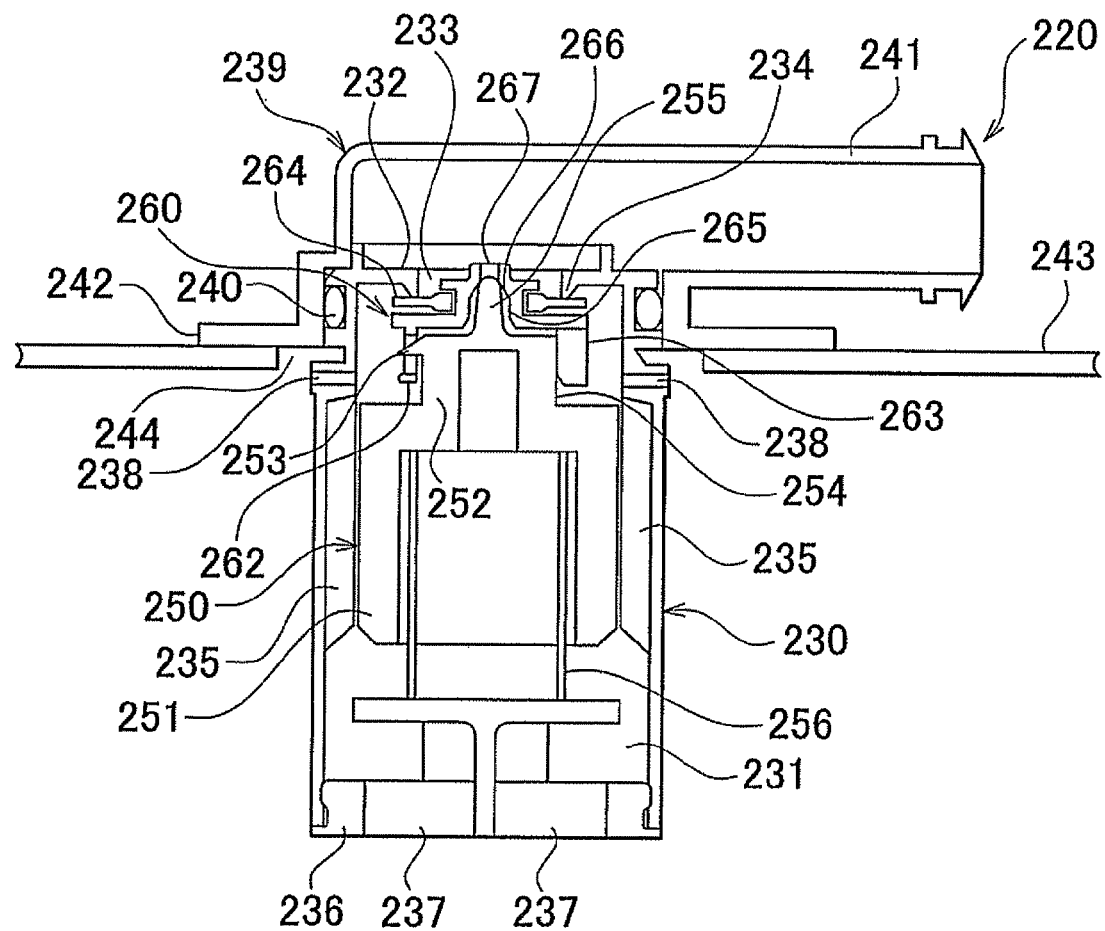
FIG. 14 is a full sectional view of a fuel cut-off valve according to a second example embodiment when both an upper float and a lower float are in closed positions.

A mounting hole 244 is provided in the upper wall surface of the fuel tank 243. The case 230 is inserted into this mounting hole 244, and the flange 242 of the cap member 239 is attached to the upper wall surface of the fuel tank 243. As a result, the fuel cut-off valve 220 is mounted inserted into the fuel tank 243, as shown in FIG. 14.

Figure 17:
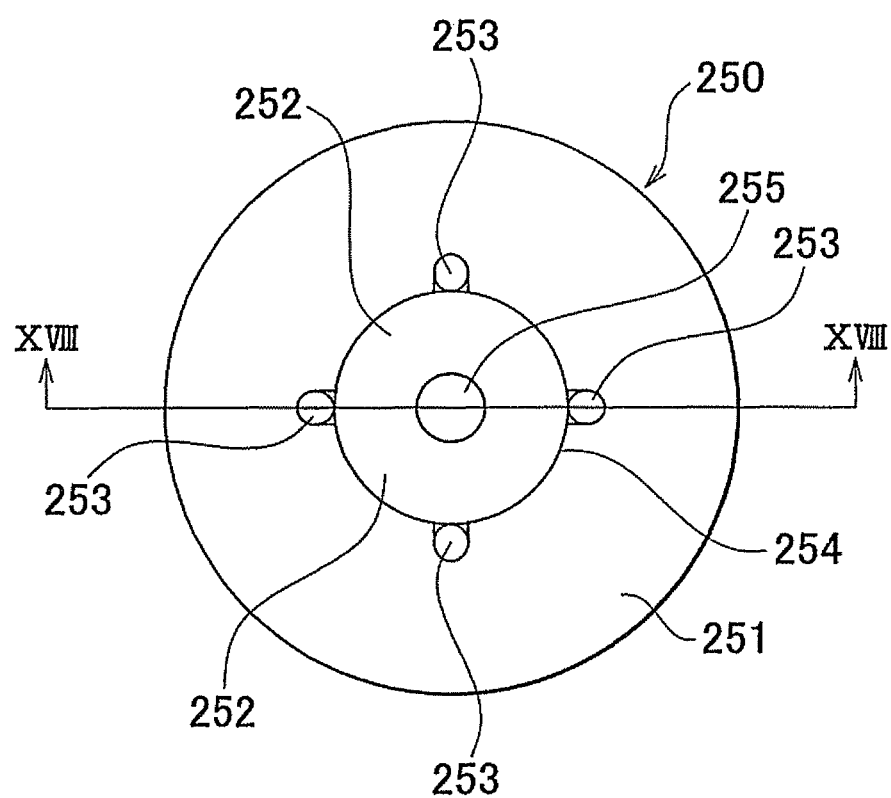
FIG. 17 is a plan view of the lower float.

The lower float 250 is a substantially hollow cylindrical member made of resin that is open at the bottom. FIG. 17 is a plan view of the lower float 250 and FIG. 18 is a sectional view of the lower float 250. The lower float 250 has a large diameter cylindrical portion 251 at the bottom and a small diameter cylindrical portion 252 at the top. The outer peripheral portion of the large diameter cylindrical portion 251 is guided by vertical longitudinal ribs 235 provided on the inside surface of the case 230.

The small diameter cylindrical portion 252 extends upward from the upper wall of the large diameter cylindrical portion 251. A plurality of, such as four, retaining members 253 that extend radially outward are provided at substantially equidistant intervals on the upper outer peripheral surface of the small diameter cylindrical portion 252. The outer peripheral surface of the small diameter cylindrical portion 252 forms a guide portion 254, and guide members 263 of the upper float 260, which will be described later, slidably contacts that guide portion 254. Moreover, a first valve member 255, the tip end of which has an inverted U-shaped cross section that is arc-shaped, that opens and closes a third opening 267, which will be described later, is formed erect in the center on the upper surface of the small diameter cylindrical portion 252.

A spring 256 is interposed between the lower float 250 and the bottom member 236. This spring 256 itself does not have enough force to lift the lower float 250. Instead, it provides force that helps the lower float 250 to rise quickly when the lower float 250 rises due to buoyancy from the fuel when fuel enters the case 230.

Figure 19:
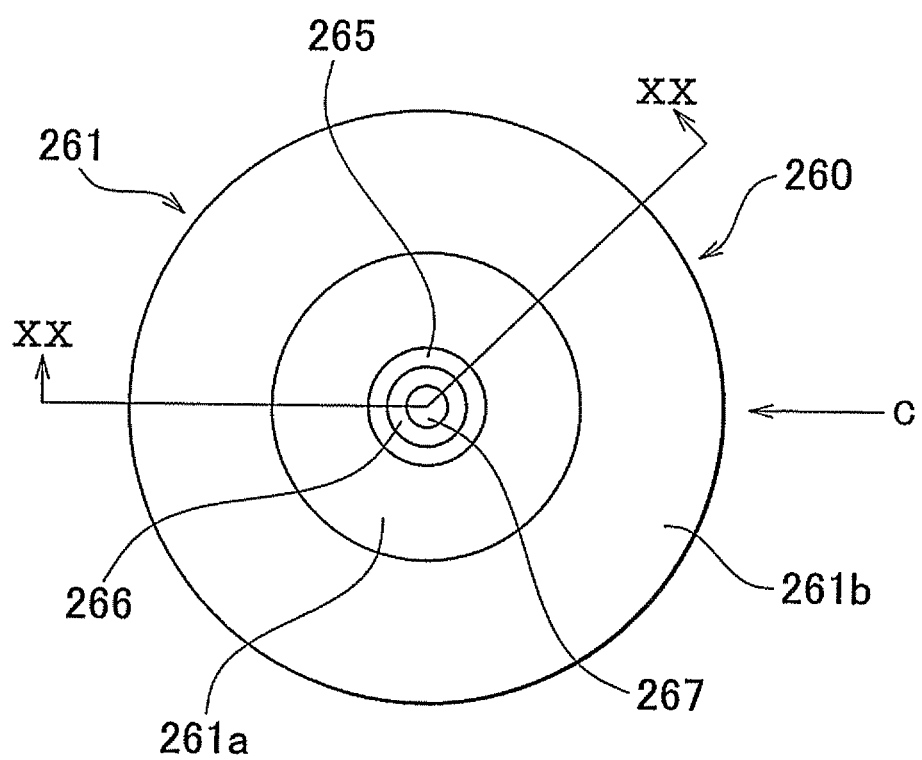
FIG. 19 is a plan view of the upper float.
Figure 20:
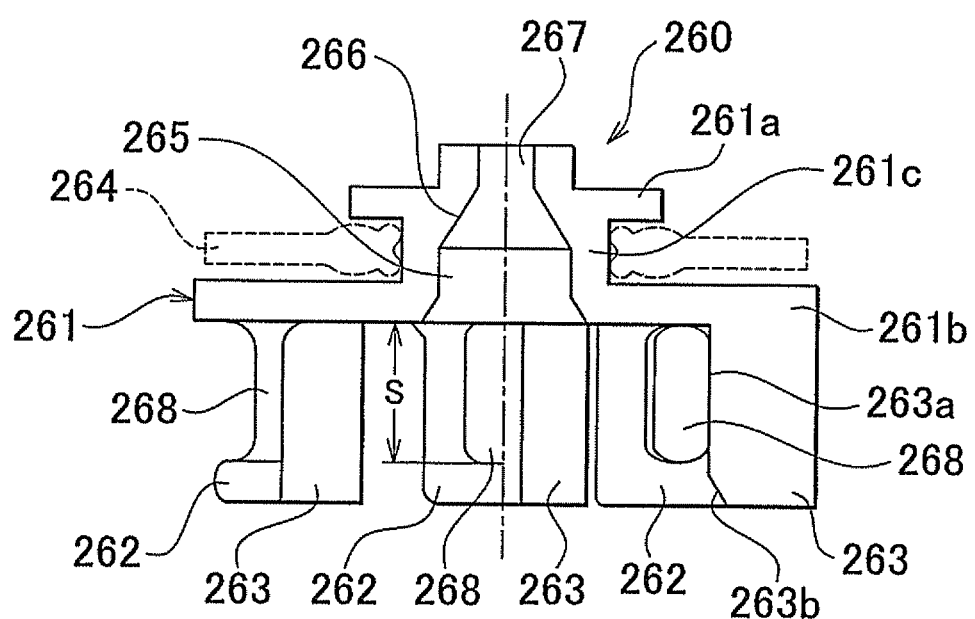
FIG. 20 is a sectional view taken along line XX-XX in FIGS. 19 and 22.
Figure 21:
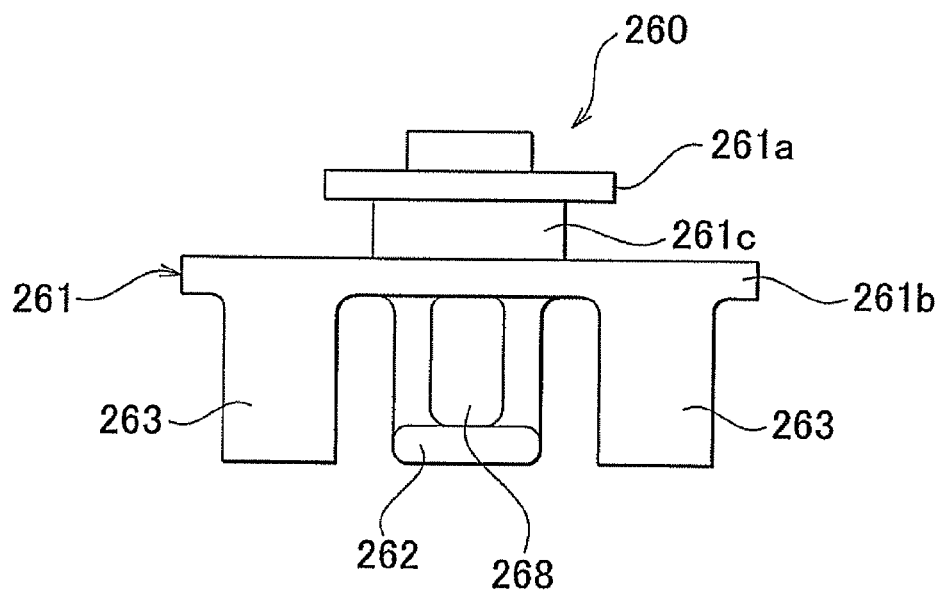
FIG. 21 is a view in the direction of arrow C in FIG. 19.
Figure 22:
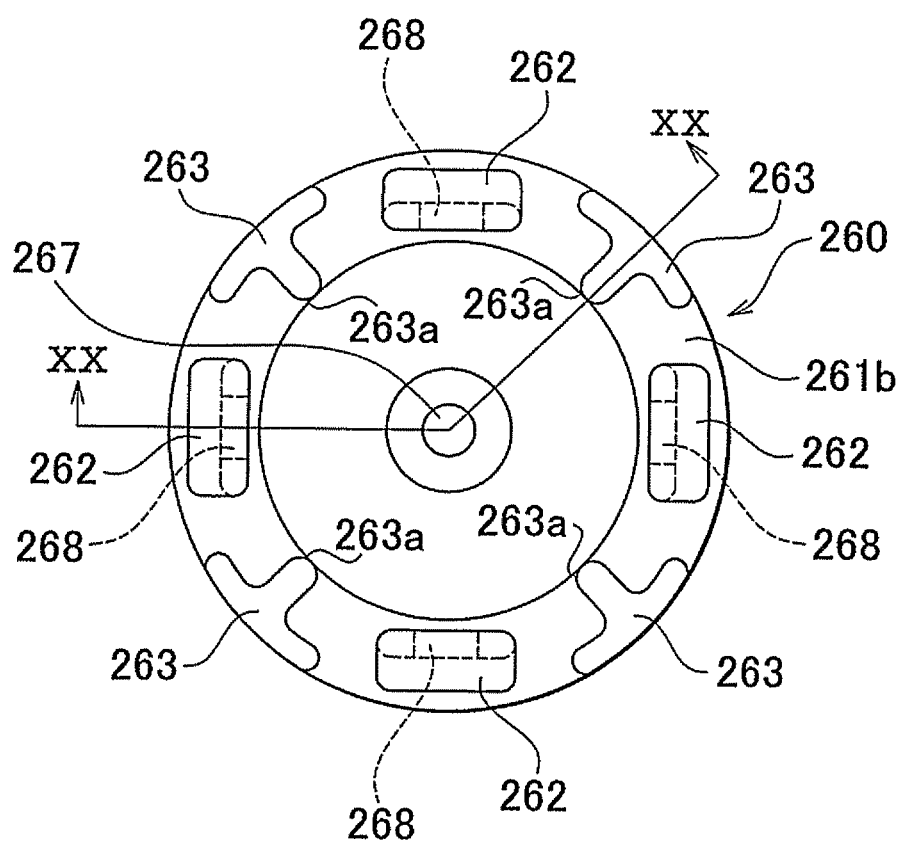
FIG. 22 is a bottom view of the upper float.

The upper float 260 is provided above the small diameter cylindrical portion 252 of the lower float 250. FIG. 19 is a plan view of the upper float 260, FIG. 20 is a sectional view of the upper float 260, FIG. 21 is a bottom view of the upper float 260, and FIG. 22 is a bottom view of the upper float 260.

The upper float 260 is made of resin and has a main body member 261, mounting members 262, and guide members 263. The main body member 261 has an upper small diameter disc portion 261a, a lower large diameter disc portion 261b, and a columnar portion 261c that connects the small diameter disc portion 261a with the large diameter disc portion 261b. A second valve member 264 that is donut-shaped and made of rubber fits on the columnar portion 261c. This second valve member 264 abuts against the second valve seat 234 formed on the upper portion of the case 230 when the lower float 250 rises, thereby preventing fuel and the like from flowing out to the second opening 233 side. In this case, the second valve member 264 fits with some leeway both front to back and left to right, such that close contact is able to be maintained between the second valve member 264 and the second valve seat 234 even if the upper float 260 is somewhat inclined.

Also, a second concave joining portion 265 is formed up to the small diameter disc portion 261a in the center of the lower portion of the main body member 261. This second concave joining portion 265 is large enough so that the first valve member 255 can fit into it, and narrows slightly toward the top. A first valve seat 266 against which the first valve member 255 abuts is formed at that narrow portion. A third opening 267 that is communicated with the communication passage 241 of the cap member 239 is formed where the upper portion of this concave joining portion 265 is narrow.

Then the first valve member 255 is fitted into this concave joining portion 265, and the upper float 260 is pivotally supported on the upper portion of the lower float 250 by abutting against the first valve seat 266.

The mounting members 262 are a plurality of, such as four, members that have a generally rectangular cross section and are also generally rectangular when viewed from the side, and are formed hanging down at equidistant locations concyclically from the outer periphery of the bottom surface of the main body member 261. Longitudinal, generally rectangular engaging grooves 268 with which the four retaining members 253 that are formed on the outer peripheral surface of the upper portion of the small diameter cylindrical portion 252 of the lower float 250 engage are formed in the center of these mounting members 262. These mounting members 262 are formed with a narrow width so that they can be pushed outward by the retaining members 253 when attaching the upper float 260 to the lower float 250. Incidentally, arranging the mounting members 262 at equidistant locations concyclically makes it possible to more reliably attach and support the lower float 250 and the upper float 260.

The guide members 263 are a plurality of, such as four, columnar members with a generally T-shaped cross section formed hanging down at equidistant locations concyclically from the outer periphery of the bottom surface of the main body member 261, similar to the mounting members 262, and are provided alternately with the mounting members 262 as shown in FIG. 22. These guide members 263 are formed with a generally T-shaped cross section and having a width that makes them strong and sturdy (e.g., a width that is wider than the width of the mounting members 262), in order to guide the guide portion 254 of the lower float 250.

Also, the guide members 263 are arranged in a radial configuration such that the inner peripheral edge 263a, which is one end of a general T-shape, i.e., the tip end of a line segment that extends orthogonally from the center of a horizontal line segment, of each guide member 263 points toward the center of the concave joining portion 265, as shown in FIG. 22. These inner peripheral edges 263a are formed curved when viewed from above, i.e., in an arc or a semicircle or the like when viewed from above, and serve to guide the guide portion 254 of the lower float 250 (more specifically, the vertically linear portions positioned farthest toward the inside serve to guide the guide portion 254 of the lower float 250).

Shaping the inner peripheral edges 263a in this way reduces the likelihood of the guide portion 254 getting caught on the inner peripheral edges 263a, thus making the vertical movement of the lower float 250 smoother. Incidentally, the guide members 263 do not have to be equidistant, and they may be any shape as long as they follow the outer periphery of the guide portion 254 of the lower float 250.

Also, the size of the circle that can be drawn at the inner peripheral edges 263a of the guide members 263 is the same as or slightly smaller than the size of the circle that can be drawn at the inner peripheral ends of the mounting members. With this kind of shape, even if secondary deformation occurs in the mounting members 262 such that the mounting members 262 end up being spread outward, for example, the lower float 250 moves up and down along the guide member 263 where there is little or no secondary deformation of the upper float 260, so that alignment can be guaranteed.

Also, the gap between the inner peripheral edges 263a of the guide members 263 and the lower float 250 is made as small as possible. Further, the inside lower end portions of the inner peripheral edges 263a of the guide members 263 are formed as tapered portions 263b (see FIG. 20), which facilitates assembly when the guide members 263 are inserted into the guide portion 254.

Figure 23A:
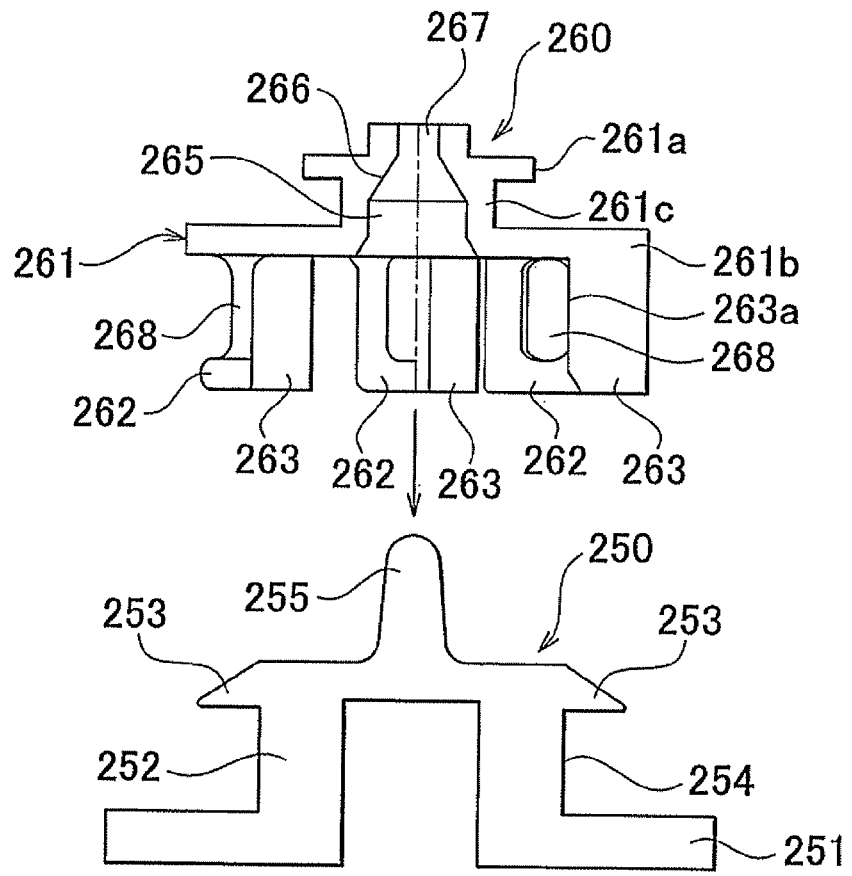
FIGS. 23A and 23B are views showing how the upper float is attached to the lower float.
Figure 23B:
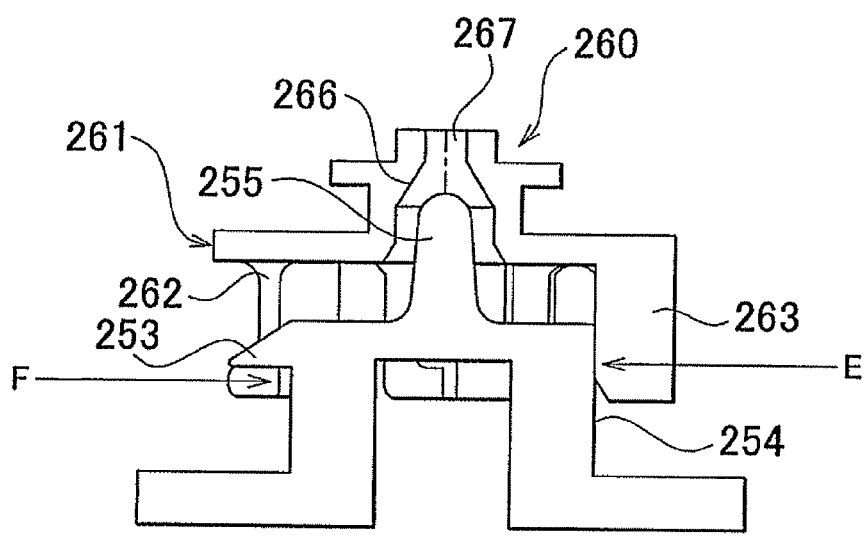
Figure 24:
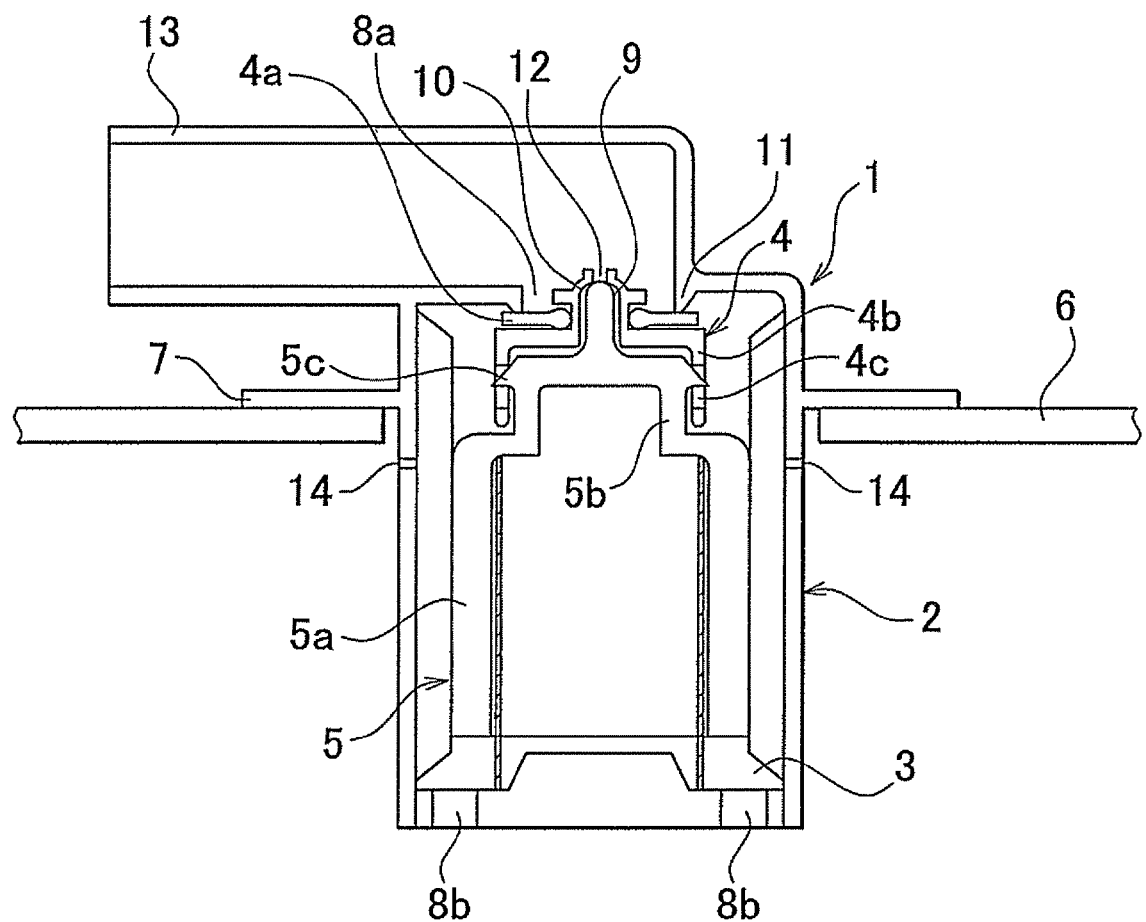
FIG. 24 is a full sectional view of a fuel cut-off valve according to related art.
Figure 25:
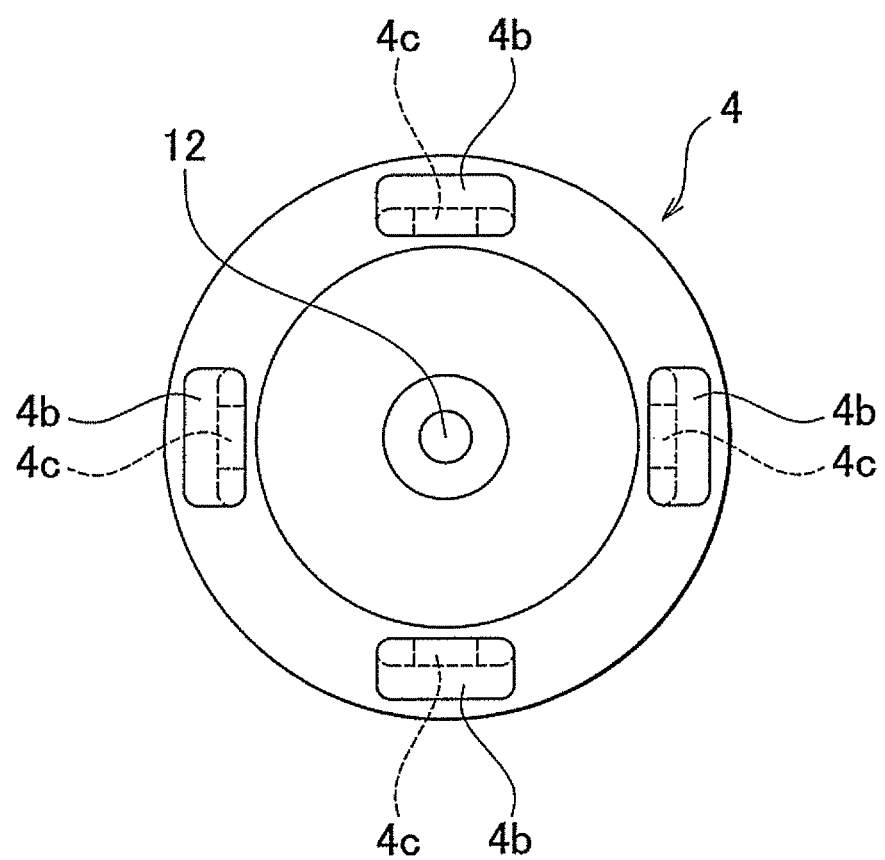
FIG. 25 is a bottom view of an upper float according to the related art.

Next, the attachment of the upper float 260 to the lower float 250 will be described. FIG. 23A is a view showing the upper float 260 and the lower float 250 before they are attached together, and FIG. 23B is a view showing the upper float 260 and the lower float 250 after they are attached together. The upper float 260 is placed above the lower float 250, and then pushed down with force from above as indicated by the arrow. When this is done, the mounting members 262 spread outward by the retaining members 253, and the upper float 260 is pushed along the outer periphery of the small diameter cylindrical portion 252 of the lower float 250 until eventually the four retaining members 253 formed on the upper outer periphery of the small diameter cylindrical portion 252 fit into the corresponding engaging grooves 268 of the four mounting members 262, such that the members are snap-fitted or force-fit together.

At the same time, the guide members 263 of the upper float 260 fit into the guide portion 254 of the lower float 250. The tapered portions 263b formed on the inside lower end portions of the inner peripheral edges 263a of the guide members 263 facilitate this. Also, at the same time, the first valve member 255 fits into the concave joining portion 265. As a result, the upper float 260 moves up and down together with the lower float 50 without separating from it. Also, the upper float 260 moves up and down along the guide members 263 where the gap is small and there is little or no secondary deformation, so the offset between the lower float 250 and the upper float 260 is small. Incidentally, location E in FIG. 23B is the location where the guide member 263 abuts against the guide portion 254 (where the gap is small), and location F is the location where the mounting members 262 abut against the guide portion 254 (where the gap is slightly larger).

Figure 15:
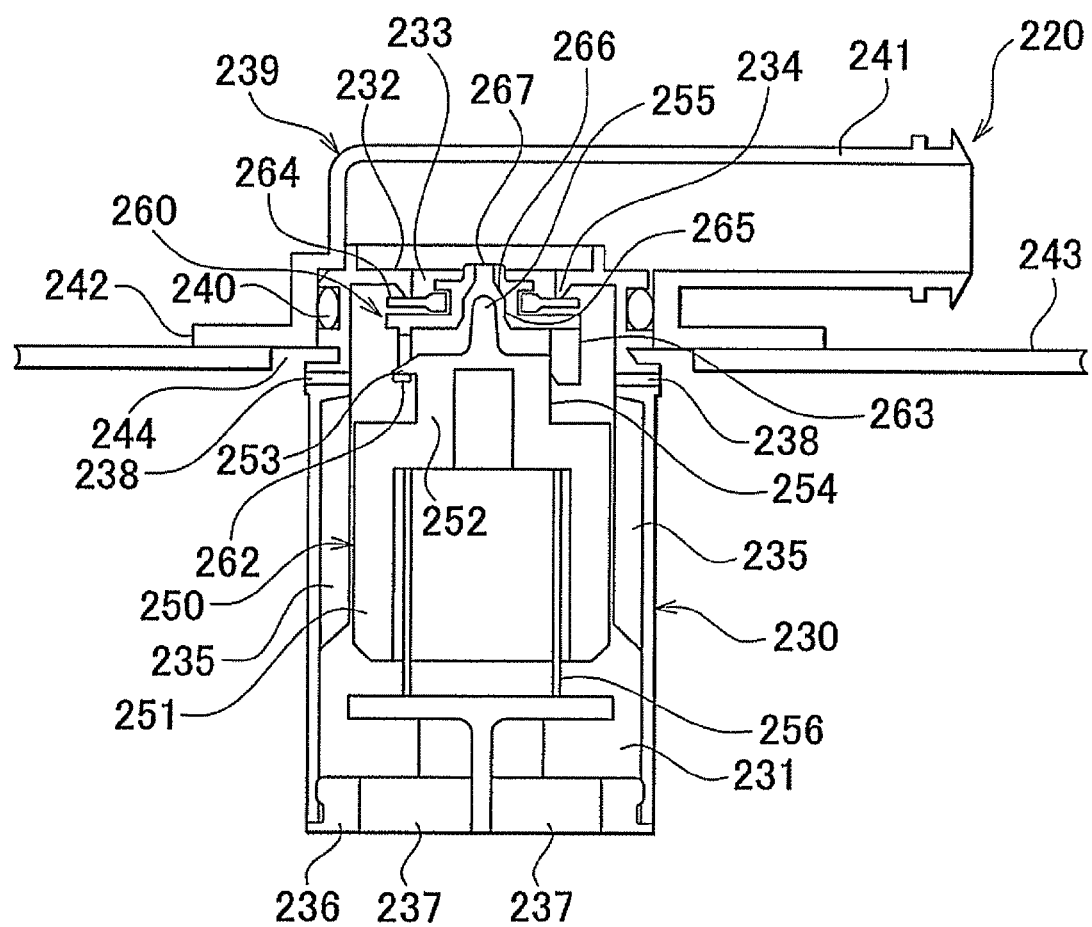
FIG. 15 is a full sectional view of the fuel cut-off valve according to the second example embodiment when the upper float is in a closed position and the lower float is in an open position.

The engaging grooves 268 have a length S (see FIG. 20). When the second opening 233 where the upper float 260 abuts against the second valve seat 234 is blocked off, the lower float 250 is able to fall by the length S, and at that time, the first valve member 255 of the lower float 250 opens the third opening 267 of the upper float 260. FIG. 15 shows a view of this state.

Next, the operation of the fuel cut-off valve 220 when the fuel tank is filled full and thereafter will be briefly described. When fuel enters the internal space 231 from the first opening 237 right before the tank is full, for example, that fuel flows through the internal space 231 between the inner wall surface of the case 230 and the side wall surface of the lower float 250 and attempts to flow into the communication passage 241 via the second opening 233. However, fuel that enters the internal space 231 pushes both the upper float 260 and the lower float 250 to their upper positions, which closes off the second opening 233 and prevents fuel from flowing out into the communication passage 241. FIG. 14 shows a view of this state.

In this case, the guide member 263 of the upper float 260 moves upward while being guided by the guide member 254 of the lower float 250, so the offset of these members is small.

Right after the tank has been filled full, the pressure inside the fuel tank 243 is high. As a result, high pressure is applied to the second valve member 264 from underneath so the second valve member 264 abuts with strong force against the second valve seat 234 and will not come out of abutment even if the pressure inside the fuel tank 243 drops somewhat. However, the lower float 250 abuts against the upper float 260 over the small area of the first valve member 255 and the concave joining portion 265, so the concave joining portion 265 and the first valve member 255 will come out of abutment with even the slightest drop in the fuel level inside the fuel tank 243. If this happens, the lower float 250 will fall under its own weight, so the upper float 260 will be in the upper position and the lower float 250 will be in a lower position by the length S. FIG. 15 is a view showing this state.

Figure 16:
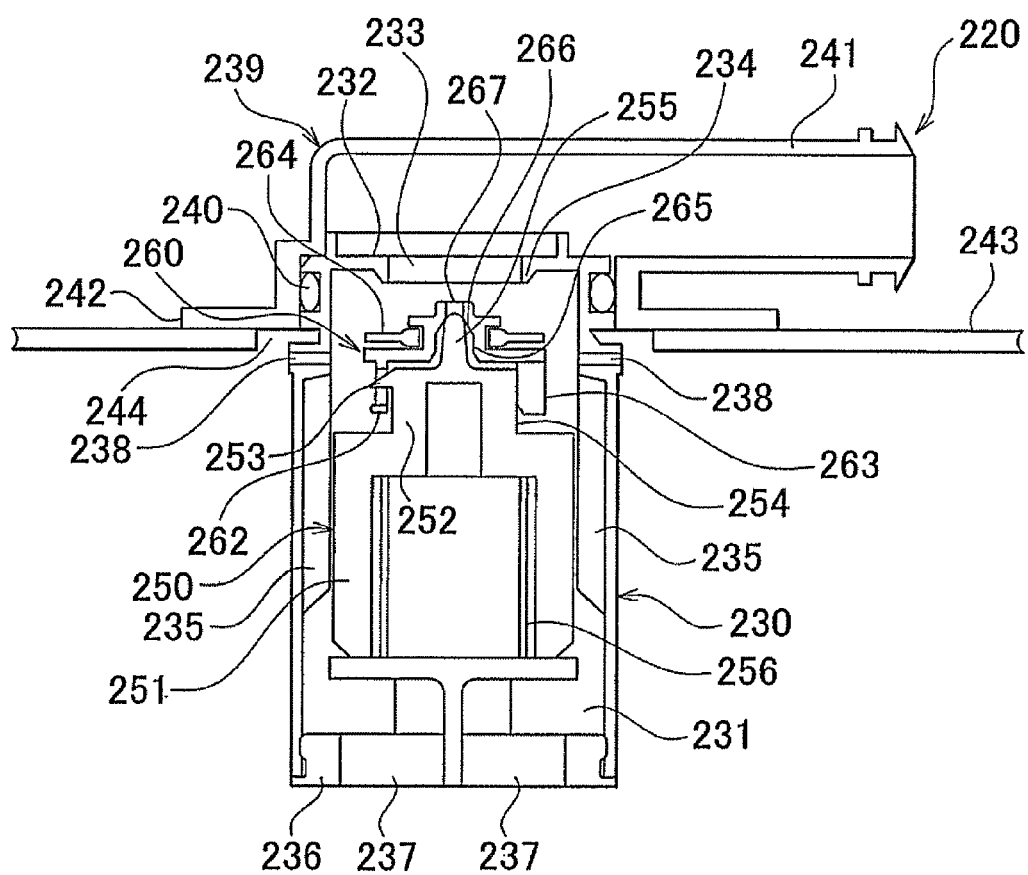
FIG. 16 is a full sectional view of the fuel cut-off valve according to the second example embodiment when both the upper float and the lower float are in open positions.

After a period of time has passed after the tank has been filled full, the third opening 267 of the upper float 260 opens, so the pressure difference between the inside and the outside of the case 230 drops. As a result, the upper float 260 and the lower float 250 drop to their lower positions, such that fuel vapor produced in the fuel tank 243 enters the internal space 231 through the side holes 238 and flows to the canister via the second opening 233 and the communication passage 241, thereby ventilating the fuel tank 243. FIG. 16 is a view showing this state.

The fuel cut-off valve of the invention will now be summarized.

The fuel cut-off valve according to the first example embodiment includes a case having a first opening communicated with the inside of a fuel tank and a second opening communicated with a canister; a lower float that is provided so as to move up and down inside the case and has a first valve member above the lower float; an upper float that is provided so as to move up and down on an upper portion of the lower float and has a second valve member and a third opening communicated with the canister; a first valve seat provided on the upper float, against which the first valve member abuts to close off the third opening; a second valve seat against which the second valve member abuts to close off the second opening; and a guide member that guides the upper float when the upper float moves up and down. The second valve seat is provided on the case. The upper float has a cylindrical body that surrounds the third opening and extends upward. The guide member guides the cylindrical body. The guide member guides the cylindrical body to the inside of the second valve seat, and limits the amount of offset of the upper float.

According to this structure of the fuel cut-off valve, the alignment of the small diameter first valve member of the lower float and the small diameter first valve seat of the upper float can be improved, which enables the seal at the seal location to be improved. Further, providing the guide location by the guide member to the inside of the second valve seat reduces the sliding resistance at the guide location when the upper float moves up and down compared with when the guide location is to the outside of the second valve seat, thereby making the vertical movement of the upper float smoother. Accordingly, the alignment of the small diameter first valve member of the lower float and the small diameter first valve seat of the upper float can be improved, which in turn improves the seal at the seal location.

The clearance between the cylindrical body and the guide member may be less than the clearance between the case and the lower float.

According to this structure, the alignment of the small diameter first valve member of the lower float and the small diameter first valve seat of the upper float can be improved, which enables the seal at the seal location to be improved.

The cylindrical body may be guided by the guide member all the way between a lowest position of the lower float and a highest position of the lower float.

According to this structure, the amount of offset of the upper float can be reliably reduced.

A tip end of the cylindrical body may be tapered.

This structure enables the assembly of the guide member and the cylindrical body to be improved.

An inner peripheral edge of the guide member may have a semicircular cross section.

This structure enables the vertical movement of the cylindrical body with respect to the guide member to be smoother.

The first valve member may be separate from the lower float and seal the third opening by following the first valve seat when there is offset between the first valve member and the first valve seat.

According to this structure, the alignment of the first valve member (which corresponds to the middle float) and the first valve seat of the upper float can be improved regardless of whether the lower float moves. As a result, the seal is able to be improved.

The first valve member may snap-fit engage with the lower float and move together with the lower float when the first valve member opens.

This structure enables the first valve member to be easily fitted to the lower float.

A concave joining portion with an inverted U-shaped cross section may be provided in the center of the bottom portion of the first valve member, and a protruding portion with an inverted U-shaped cross section may be provided in the center of the upper portion of the lower float. Also, the concave joining portion may fit together with the protruding portion, and the first valve member may be able to move with respect to the lower float.

According to this structure, the movement of the first valve member is able to be made smooth, which further improves the alignment of the first valve member and the first valve seat of the upper float.

The fuel cut-off valve according to the second example embodiment includes a case having a first opening communicated with the inside of a fuel tank and a second opening communicated with a canister; a lower float that is provided so as to move up and down inside the case and has a first valve member above the lower float; an upper float that is provided so as to move up and down on an upper portion of the lower float and has a second valve member and a third opening communicated with the canister; a first valve seat provided on the upper float, against which the first valve member abuts to close off the third opening; a second valve seat against which the second valve member abuts to close off the second opening; and a guide member that guides the upper float when the upper float moves up and down. The upper float has a guide member and a mounting member that extend downward. The lower float has a retaining member that engages with the mounting member and a guide portion that is guided by the guide member. The amount of offset of the upper float is limited by the retaining member engaging with the mounting member and the guide member guiding the guide portion.

According to this structure, for example, even if secondary deformation occurs in the mounting member of the upper float when the upper float is mounted to the lower float or the like, both members are able to be guided by the guide portion of the lower float and the guide member of the upper float that make it easy to improve strength and dimensional accuracy. Accordingly, the offset together with the alignment of the lower float and the upper float can be more reliably improved, and the reliability of the fuel cut-off valve can also be improved.

The mounting member and the guide member may each be provided in plurality, and the mounting members and the guide members may be provided alternately and concyclically.

This structure enables the lower float and the upper float to be more reliably attached and guided.

The size of a circle that can be drawn at the inner peripheral edges of the guide members may be smaller than the size of a circle that can be drawn at the inner peripheral edges of the mounting members.

According to this structure, the mounting member only has to be precise enough to attachment the members, because alignment is achieved by the guide portion and the guide member in which there is little secondary deformation, so offset due to secondary deformation is reduced, which improves the reliability of the fuel cut-off valve.

The mounting members and the guide members may be provided at equidistant intervals.

This structure enables the lower float and the upper float to be better attached and guided.

The inner peripheral edge of the guide member may be arc-shaped when viewed from above.

According to this structure, the vertical movement of the guide portion, i.e., the lower float, with respect to the guide member can be made smoother.

The inside lower end portion of the guide member may be tapered.

This structure enables the assemblability of the guide member and the guide portion to be improved.

While the invention has been described with reference to example embodiments thereof, it is to be understood that the invention is not limited to the described embodiments or constructions. The invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A fuel cut-off valve comprising:
a case having (i) a first opening communicated with an inside of a fuel tank, (ii) a second opening communicated with a canister, and (iii) a guide member;
a lower float that is provided so as to move up and down inside the case and has a first valve member above the lower float;
an upper float that is provided so as to move up and down above an upper portion of the lower float and has a second valve member and a third opening communicated with the canister, the upper float having a cylindrical body that surrounds the third opening and extends upward;
a first valve seat provided on the upper float, against which the first valve member abuts to close off the third opening;
a second valve seat against which the second valve member abuts to close off the second opening,
wherein:
the guide member has an inner peripheral edge that faces an outer periphery of the cylindrical body,
the guide member guides the upper float when the upper float moves up and down, and
the inner peripheral edge is located at an inside of the second valve seat in a radial direction.

2. The fuel cut-off valve according to claim 1, wherein the second valve is provided on the case; and the guide member is provided on the case.

3. The fuel cut-off valve according to claim 2, wherein the guide member limits the amount of offset of the upper float.

4. The fuel cut-off valve according to claim 2, wherein a clearance between the cylindrical body and the guide member is less than a clearance between the case and the lower float.

5. The fuel cut-off valve according to claim 2, wherein the cylindrical body is guided by the guide member all the way between a lowest position of the lower float and a highest position of the lower float.

6. The fuel cut-off valve according to claim 2, wherein a tip end of the cylindrical body is tapered.

7. The fuel cut-off valve according to claim 2, wherein an inner peripheral edge of the guide member has a semicircular cross section.

8. The fuel cut-off valve according to claim 7, wherein the semicircular cross section is a semicircular vertical cross section in the radial direction of the guide member.

9. The fuel cut-off valve according to claim 2, wherein the first valve member is separate from the lower float and seals the third opening by following the first valve seat when there is offset between the first valve member and the first valve seat.

10. The fuel cut-off valve according to claim 9, wherein the first valve member snap-fit engages with the lower float and moves together with the lower float when the first valve member opens.

11. The fuel cut-off valve according to claim 9, wherein a concave joining portion with an inverted U-shaped cross section, is provided at the center of the bottom portion of the first valve member; a protruding portion with an inverted U-shaped cross section is provided at the center of the upper portion of the lower float; and the concave joining portion fits together with the protruding portion to thereby allow the first valve member to move with respect to the lower float.

12. The fuel cut-off valve according to claim 1, wherein the guide member guides the cylindrical body by contacting the cylindrical body.

\* \* \* \* \*